W. J. GIBBONS.
COMBINED JUNCTION BOX AND CUT-OUT AND SWITCH SUPPORT.
APPLICATION FILED JUNE 2, 1909.
967,632.
Patented Aug. 16, 1910.
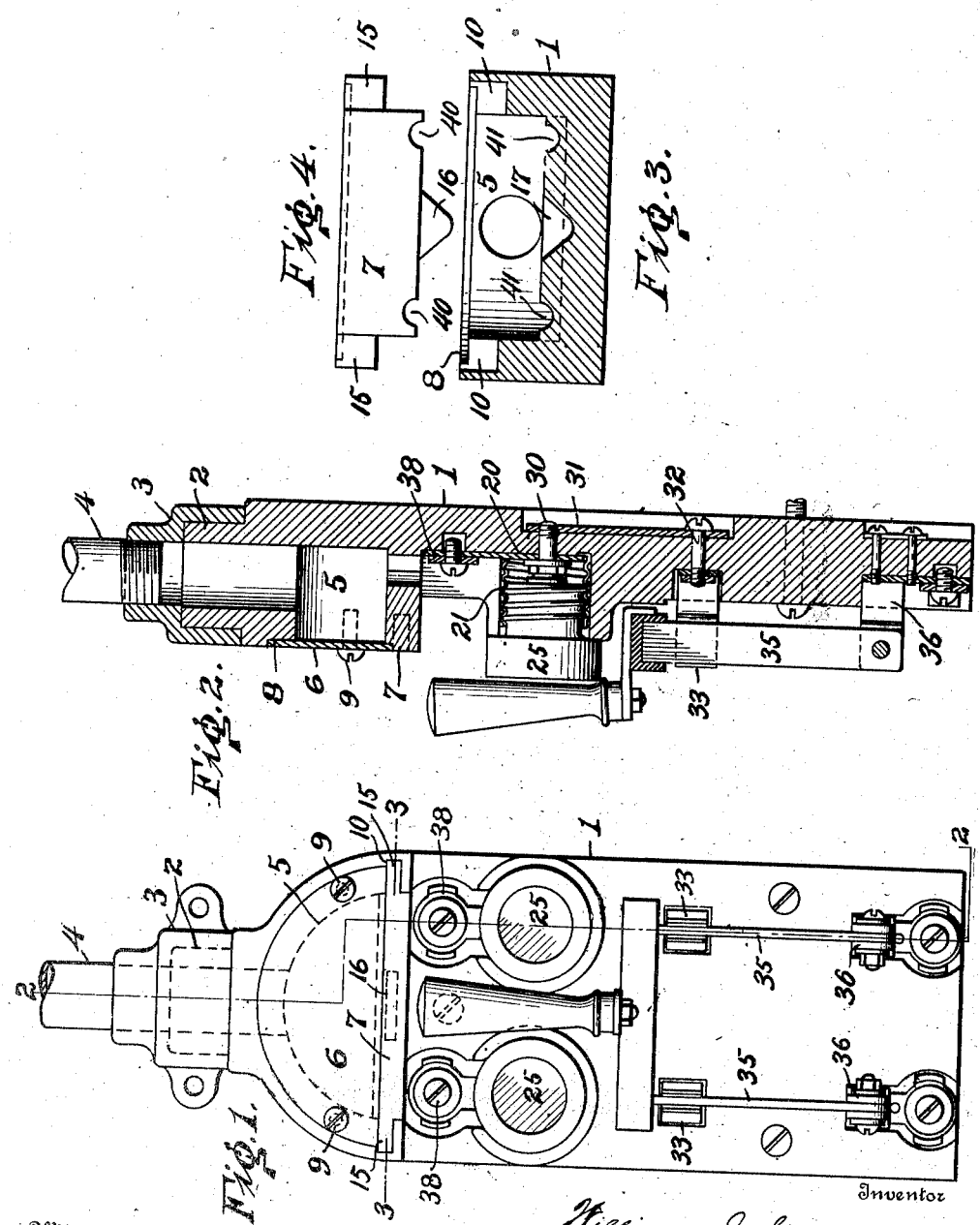

UNITED STATES PATENT OFFICE.

WILLIAM J. GIBBONS, OF PHILADELPHIA, PENNSYLVANIA.

COMBINED JUNCTION-BOX AND CUT-OUT AND SWITCH-SUPPORT.

967,632. Specification of Letters Patent. Patented Aug. 16, 1910.

Application filed June 2, 1909. Serial No. 499,767.

*To all whom it may concern:*

Be it known that I, WILLIAM J. GIBBONS, a citizen of the United States, residing in the city and county of Philadelphia, State of Pennsylvania, have invented a certain new and useful Combined Junction-Box and Cut-Out and Switch-Support, of which the following is a specification.

My invention relates to combined junction boxes and cut-outs and switch supports, and it has for its object to provide a construction in which the junction box, the cut-out and the switch are supported upon a single base.

Other objects and advantages of my construction will appear from the detailed description of my invention which follows.

A convenient embodiment of my invention is illustrated in the accompanying drawings forming a part of my specification, but it will be understood that various changes may be made in the details of construction within the scope of my claims without departing from my invention.

In the drawings:—Figure 1 is a front elevation of a junction box, cut-outs and switch embodying my invention; Fig. 2 is a longitudinal section on the line 2—2 of Fig. 1; Fig. 3 is a transverse section on the line 3—3 of Fig. 1; and Fig. 4 is a side elevation of a removable wall of the junction box.

In the drawings:—1 designates the base which consists of a single non-conducting member, such, for instance, as porcelain. The upper end of the member 1 is provided with a reduced end portion 2 which is adapted to project into a reducing socket or fitting 3 which is secured to the lower end of a pipe or tube 4 through which the electrical wires extend into the junction box 5 formed at one end of the base 1. The junction box 5 is provided with a removable cover 6 and with a removable wall 7. The upper edges of the walls of the junction box including the removable wall 6 are rabbeted as indicated at 8 to form a seat for the cover 6 so as to bring it flush with the upper edges of the walls of the junction box when it is secured in position by means of the screws 9. The junction box is semi-circular and at the ends of the semi-circular walls grooves 10 are provided in which the projecting ends 15 of the removable wall 7 are seated. As a further means of steadying and securing the removable wall 7 in position, it is provided with a tongue 16 which is adapted to enter a groove 17 formed in the base 1.

Recesses 20 are provided in the base 1 for the reception of sockets 21 in which cut-out plugs 25 are located. The sockets 21 are secured in the recesses by means of screws 30 which are connected to conducting plates 31 upon the under side of the base 1. The said plates 31 are also connected by means of screws 32 to contact members 33 upon the front face of the base which are adapted to be engaged by a knife switch 35 pivoted to posts 36. The wires which are extended into the junction box from the pipe or tube 4 are connected to binding posts 38.

The connections and passage of the circuit from the binding posts 38 to and through the switch 35 will not be traced or pointed out, for the reason that I do not claim anything new or novel in connection with the circuit through these members.

It is not necessary that there shall be a close fit between the reduced end portion 2 and the reducing socket 3, by reason of which the socket or part 3 may be made of sufficient size to accommodate devices having reduced end portions of varying sizes.

The recesses formed to receive the sockets for the cut-out plugs are located at sufficient distances from the nearest portion or side of the junction box to enable the operative to readily work in the space below and in the junction box when its cover is removed in connecting or joining the wires to the binding posts 38. By constructing the box with the removable side or wall 7, I am enabled to locate the cut-out plugs nearer to said junction box than otherwise would be the case. Furthermore, by removing the wall 7 the ends of the wires projecting from the pipe 4 may be carried more readily to the binding posts 38 than if it were necessary to pass the wires through holes formed in a non-removable wall adjacent to the said binding posts.

It will be noted that the holes through the lower wall of the junction box are provided by removing semi-circular portions from the removable wall 7, as indicated at 40, and from the base 1, as indicated at 41.

Having thus described my invention, I claim:—

1. A device of the character described, comprising a base of insulating material adapted to support an electric switch and having seats formed therein for the reception of cut-out devices and a junction box formed integrally with the said base and at one end thereof, the said junction box being spaced a distance from the said seats and having a removable wall opposed to the said seats.

2. A device of the character described, comprising a base of insulating material adapted to support an electric switch and having receptacles formed therein for the reception of cut-out devices and a junction box formed integrally with the said base which box is situated in operative relation to the said receptacles for the cut-out devices and the said base having a reduced end portion, substantially as described.

3. The combination of a junction box and cut-out devices having a common base, the said junction box having a removable cover and the wall of the said junction box nearest to the said cut-out devices being removable.

4. A device of the character described comprising a base of insulating material adapted to support an electric switch and also adapted to support cut-out devices, and the said base having a junction box integral therewith, which junction box is located in proximity to the said cut-out devices, and the said base having a reduced end portion having an opening therethrough which communicates with the said junction box.

In testimony that I claim the foregoing as my invention, I have hereunto signed my name this 29th day of May, A. D. 1909.

WILLIAM J. GIBBONS.

In the presence of—
S. SALOME BROOKE,
CYRUS N. ANDERSON.